(12) United States Patent
Zhang et al.

(10) Patent No.: US 11,900,253 B2
(45) Date of Patent: *Feb. 13, 2024

(54) TILING FORMAT FOR CONVOLUTIONAL NEURAL NETWORKS

(71) Applicant: Advanced Micro Devices, Inc., Santa Clara, CA (US)

(72) Inventors: Song Zhang, Shanghai (CN); Jiantan Liu, Shanghai (CN); Hua Zhang, Shanghai (CN); Min Yu, Shanghai (CN)

(73) Assignee: Advanced Mic ro Devices, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/050,939

(22) Filed: Oct. 28, 2022

(65) Prior Publication Data

US 2023/0186084 A1 Jun. 15, 2023

Related U.S. Application Data

(63) Continuation of application No. 17/006,533, filed on Aug. 28, 2020, now Pat. No. 11,494,592, which is a
(Continued)

(30) Foreign Application Priority Data

Dec. 20, 2018 (CN) .......................... 201811563959.0

(51) Int. Cl.
*G06N 3/08* (2023.01)
*G06N 3/04* (2023.01)
(Continued)

(52) U.S. Cl.
CPC ............. *G06N 3/08* (2013.01); *G06F 18/217* (2023.01); *G06N 3/04* (2013.01); *G06V 10/449* (2022.01);
(Continued)

(58) Field of Classification Search
CPC .......... G06N 3/08; G06N 3/04; G06F 18/217; G06V 10/449; G06V 10/454; G06V 10/50; G06V 10/82; G06V 10/955
(Continued)

(56) References Cited

U.S. PATENT DOCUMENTS

| 4,873,630 A | 10/1989 | Rusterholz |
| 5,657,420 A | 8/1997 | Jacobs et al. |

(Continued)

FOREIGN PATENT DOCUMENTS

| EP | 3098762 A1 | 11/2016 |
| JP | 2014203135 A | 10/2014 |

(Continued)

OTHER PUBLICATIONS

Non-Final Office Action in U.S. Appl. No. 15/657,613, dated Oct. 5, 2018, 12 pages.
(Continued)

*Primary Examiner* — Ali Bayat
(74) *Attorney, Agent, or Firm* — Kowert, Hood, Munyon, Rankin & Goetzel, P.C.; Rory D. Rankin

(57) ABSTRACT

Systems, apparatuses, and methods for converting data to a tiling format when implementing convolutional neural networks are disclosed. A system includes at least a memory, a cache, a processor, and a plurality of compute units. The memory stores a first buffer and a second buffer in a linear format, where the first buffer stores convolutional filter data and the second buffer stores image data. The processor converts the first and second buffers from the linear format to third and fourth buffers, respectively, in a tiling format. The plurality of compute units load the tiling-formatted data from the third and fourth buffers in memory to the cache and then perform a convolutional filter operation on the tiling-formatted data. The system generates a classification of a
(Continued)

first dataset based on a result of the convolutional filter operation.

20 Claims, 16 Drawing Sheets

Related U.S. Application Data continuation of application No. 16/234,956, filed on Dec. 28, 2018, now Pat. No. 10,762,392.

(51) Int. Cl.
*G06F 18/21* (2023.01)
*G06V 10/82* (2022.01)
*G06V 10/44* (2022.01)
*G06V 10/50* (2022.01)
*G06V 10/94* (2022.01)

(52) U.S. Cl.
CPC ............ *G06V 10/454* (2022.01); *G06V 10/50* (2022.01); *G06V 10/82* (2022.01); *G06V 10/955* (2022.01)

(58) Field of Classification Search
USPC ........................................................ 382/157
See application file for complete search history.

(56) References Cited

U.S. PATENT DOCUMENTS

| | | | |
|---|---|---|---|
| 6,067,287 | A | 5/2000 | Chung-Ju et al. |
| 8,131,660 | B2 | 3/2012 | Davis et al. |
| 8,369,595 | B1 | 2/2013 | Derakhshani et al. |
| 9,319,137 | B2 | 4/2016 | Zhuge et al. |
| 9,430,735 | B1 | 8/2016 | Vali |
| 10,078,794 | B2 | 9/2018 | Pierce et al. |
| 10,582,250 | B2 | 3/2020 | Zhang et al. |
| 10,740,674 | B2 | 8/2020 | Ambrose et al. |
| 10,762,392 | B2 | 9/2020 | Zhang et al. |
| 10,776,684 | B1 | 9/2020 | Agarwal et al. |
| 11,227,214 | B2 | 1/2022 | Lagudu et al. |
| 11,494,592 | B2 | 11/2022 | Zhang et al. |
| 2002/0152441 | A1* | 10/2002 | Senda ............... H03M 13/6502 714/769 |
| 2006/0031652 | A1 | 2/2006 | Richter |
| 2007/0030926 | A1* | 2/2007 | Brown .................. H04L 27/233 375/132 |
| 2011/0078342 | A1 | 3/2011 | Siddabathuni |
| 2011/0296212 | A1 | 12/2011 | Elnozahy et al. |
| 2015/0178246 | A1 | 6/2015 | Herrero Abellanas et al. |
| 2015/0242322 | A1 | 8/2015 | Vajapeyam |
| 2015/0358755 | A1 | 12/2015 | Luo et al. |
| 2016/0062294 | A1 | 3/2016 | Murashima |
| 2016/0179434 | A1 | 6/2016 | Herrero Abellanas et al. |
| 2016/0259994 | A1 | 9/2016 | Ravindran et al. |
| 2016/0350645 | A1 | 12/2016 | Brothers et al. |
| 2016/0379109 | A1 | 12/2016 | Chung et al. |
| 2017/0124451 | A1 | 5/2017 | Barham et al. |
| 2017/0286864 | A1 | 10/2017 | Fiedel et al. |
| 2017/0316312 | A1 | 11/2017 | Goyal et al. |
| 2017/0344882 | A1 | 11/2017 | Ambrose et al. |
| 2018/0032859 | A1 | 2/2018 | Park et al. |
| 2018/0032867 | A1 | 2/2018 | Son et al. |
| 2018/0046900 | A1* | 2/2018 | Dally ..................... G06N 3/082 |
| 2018/0082212 | A1 | 3/2018 | Faivishevsky et al. |
| 2018/0089087 | A1* | 3/2018 | Chang ................. G06F 12/0862 |
| 2018/0096226 | A1 | 4/2018 | Aliabadi |
| 2018/0174036 | A1 | 6/2018 | Han et al. |
| 2018/0189641 | A1 | 7/2018 | Boesch et al. |
| 2018/0218303 | A1 | 8/2018 | Cole et al. |
| 2018/0262291 | A1 | 9/2018 | Doster |
| 2018/0365558 | A1 | 12/2018 | Sekiyama et al. |
| 2019/0026237 | A1* | 1/2019 | Talpes .................... G06N 3/063 |
| 2019/0205745 | A1 | 7/2019 | Sridharan et al. |
| 2019/0266015 | A1 | 8/2019 | Chandra et al. |
| 2019/0324755 | A1* | 10/2019 | Herr ......................... G06F 8/52 |
| 2019/0324759 | A1 | 10/2019 | Yang et al. |
| 2019/0325296 | A1 | 10/2019 | Fowers et al. |
| 2019/0325305 | A1 | 10/2019 | Zhang et al. |
| 2020/0134432 | A1 | 4/2020 | Lagudu et al. |
| 2020/0258223 | A1* | 8/2020 | Yip ....................... G06T 7/0012 |
| 2020/0302285 | A1 | 9/2020 | Wang et al. |

FOREIGN PATENT DOCUMENTS

| | | |
|---|---|---|
| JP | 2016033806 A | 3/2016 |
| JP | 2017151604 A | 8/2017 |
| WO | 2017003887 A1 | 1/2017 |

OTHER PUBLICATIONS

Final Office Action in U.S. Appl. No. 15/657,613, dated Mar. 8, 2019, 10 pages.
International Search Report and Written Opinion in International Application No. PCT/US2018/052358, dated Feb. 18, 2019, 13 pages.
Cecconi et al., "Optimal Tiling Strategy for Memory Bandwidth Reduction for CNNs", International Conference on Advanced Concepts for Intelligent Vision Systems, Sep. 18, 2017, pp. 89-100.
Fan et al., "F-C3D: FPGA-based 3-Dimensional Convolutional Neural Network", 27th International Conference on Field Programmable Logic and Applications (FPL), Sep. 4, 2017, 4 pages.
Rahman et al., "Efficient FPGA Acceleration of Convolutional Neural Networks Using Logical-3D Compute Array", Proceedings of the 2016 Conference on Design, Automation Test in Europe, Mar. 14, 2016, pp. 1393-1398.
Notice of Allowance in U.S. Appl. No. 16/234,956, dated May 5, 2020, 10 pages.
Non-Final Office Action in U.S. Appl. No. 15/812,336, dated Oct. 14, 2020, 20 pages.
Non-Final Office Action in U.S. Appl. No. 16/117,302, dated Jan. 12, 2022, 66 pages.
Lin et al., "Deep Gradient Compression: Reducing the Communication Bandwidth for Distributed Training", ICLR 2018 Conference, Dec. 5, 2017, 13 pages.
First Examination Report in Indian Patent Application No. 202017020013, dated Mar. 28, 2022, 7 pages.
Non-Final Office Action in U.S. Appl. No. 16/367,093, dated May 19, 2022, 15 pages.
Non-Final Office Action in U.S. Appl. No. 16/177,218, dated May 23, 2022, 16 pages.
Non-Final Office Action in Japanese Patent Application No. 2020-544323, dated Aug. 23, 2022, 9 pages.
Final Office Action in U.S. Appl. No. 16/117,302, dated Sep. 14, 2022, 74 pages.
Li et al., "A High Performance FPGA-Based Accelerator for Large-Scale Convolutional Neural Networks" 2016 26th International Conference on Field Programmable Logic and Applications (FPL), 2016, 9 pages.
Final Office Action in U.S. Appl. No. 16/367,093, dated Dec. 16, 2022, 17 pages.
Advisory Action in U.S. Appl. No. 16/117,302, dated Feb. 28, 2023, 4 pages.

* cited by examiner

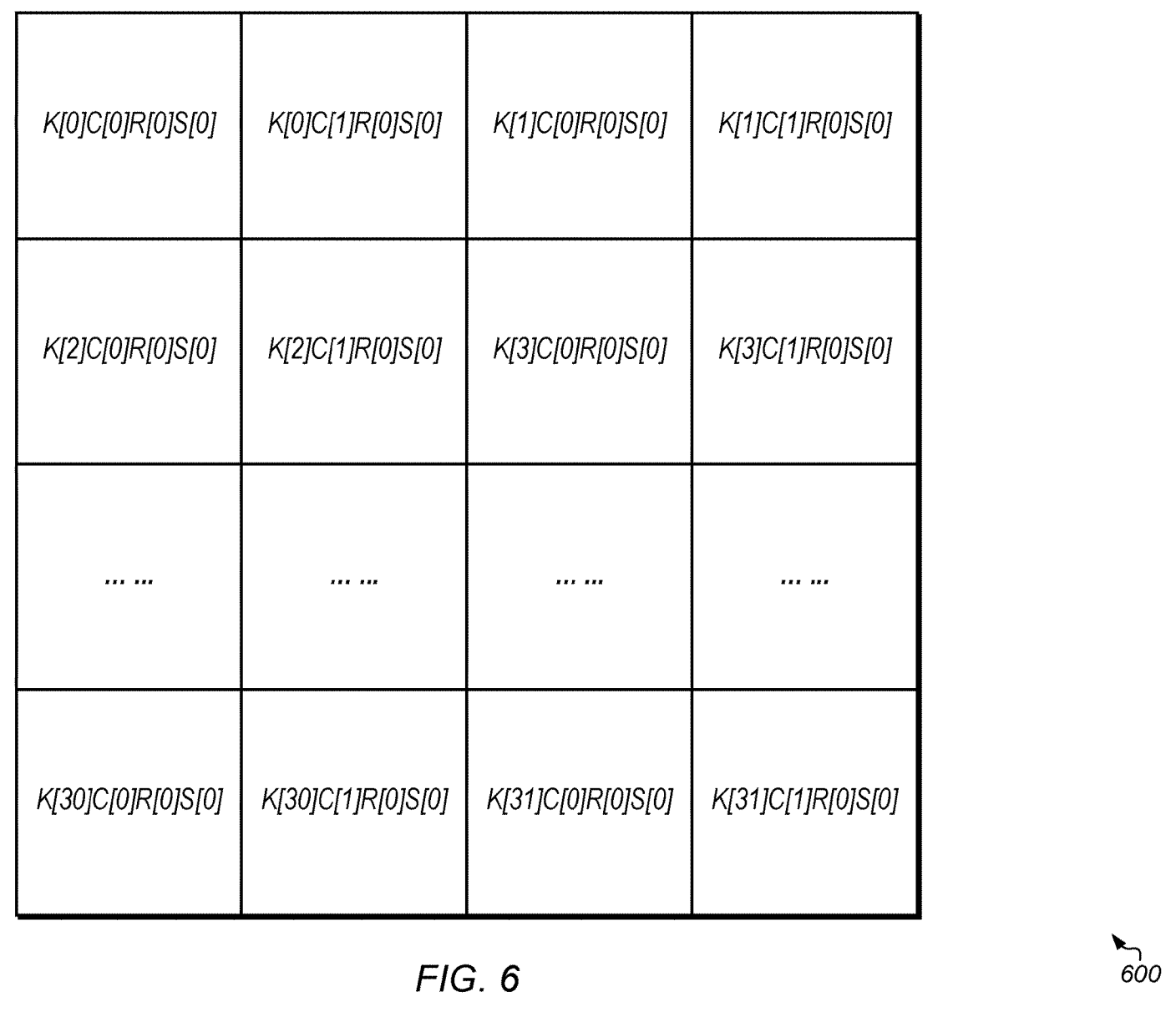

| K[0]C[0]R[0]S[0] | K[0]C[1]R[0]S[0] | K[1]C[0]R[0]S[0] | K[1]C[1]R[0]S[0] |
| --- | --- | --- | --- |
| K[2]C[0]R[0]S[0] | K[2]C[1]R[0]S[0] | K[3]C[0]R[0]S[0] | K[3]C[1]R[0]S[0] |
| .... | .... | .... | .... |
| K[30]C[0]R[0]S[0] | K[30]C[1]R[0]S[0] | K[31]C[0]R[0]S[0] | K[31]C[1]R[0]S[0] |

FIG. 6

| 32K2C1R1S Block 3 C[6:7], R=0, S=0 | 32K2C1R1S Block 7 C[6:7], R=0, S=1 | .... | 32K2C1R1S Block 35 C[6:7], R=2, S=2 |
| --- | --- | --- | --- |
| 32K2C1R1S Block 2 C[2:3], R=0, S=0 | 32K2C1R1S Block 6 C[2:3], R=0, S=1 | .... | 32K2C1R1S Block 34 C[2:3], R=2, S=2 |
| 32K2C1R1S Block 1 C[4:5], R=0, S=0 | 32K2C1R1S Block 5 C[4:5], R=0, S=1 | .... | 32K2C1R1S Block 33 C[4:5], R=2, S=2 |
| 32K2C1R1S Block 0 C[0:1], R=0, S=0 | 32K2C1R1S Block 4 C[0:1], R=0, S=1 | .... | 32K2C1R1S Block 32 C[0:1], R=2, S=2 |

*FIG. 7*

|  |  |  |  |
|---|---|---|---|
| 32K8C Block 15 K[0:31], C[120:127] | 32K8C Block 31 K[32:63], C[120:127] | 32K8C Block 47 K[64:95], C[120:127] | 32K8C Block 63 K[96:127], C[120:127] |
| ⋮ | ⋮ | ⋮ | ⋮ |
| 32K8C Block 1 K[0:31], C[8:15] | 32K8C Block 17 K[32:63], C[8:15] | 32K8C Block 33 K[64:95], C[8:15] | 32K8C Block 49 K[96:127], C[8:15] |
| 32K8C Block 0 K[0:31], C[0:7] | 32K8C Block 16 K[32:63], C[0:7] | 32K8C Block 32 K[64:95], C[0:7] | 32K8C Block 48 K[96:127], C[0:7] |

| 4C1H1W Block 0 H=0, W=0 | 4C1H1W Block 1 H=0, W=1 | ⋮ | 4C1H1W Block 33 H=0, W=33 |
|---|---|---|---|
| 4C1H1W Block 34 H=1, W=0 | 4C1H1W Block 35 H=1, W=0 | ⋮ | 4C1H1W Block 67 H=1, W=33 |
| ⋮ | ⋮ | ⋮ | ⋮ |
| 4C1H1W Block 578 H=17, W=0 | 4C1H1W Block 579 H=17, W=1 | ⋮ | 4C1H1W Block 611 H=17, W=33 |

FIG. 10

| 4C18H34W Block 0 C[0:3], H[0:17], W[0:33] Batch 0 | 4C18H34W Block 1 C[4:7], H[0:17], W[0:33] Batch 0 | ... | 4C18H34W Block 31 C[124:127], H[0:17], W[0:33] Batch 0 |
|---|---|---|---|
| 4C18H34W Block 32 C[0:3], H[16:33], W[0:33] Batch 0 | 4C18H34W Block 33 C[4:7], H[16:33], W[0:33] Batch 0 | ... | 4C18H34W Block 63 C[124:127], H[16:33], W[0:33] Batch 0 |
| 4C18H34W Block 64 C[0:3], H[0:17], W[0:33] Batch 1 | 4C18H34W Block 65 C[4:7], H[0:17], W[0:33] Batch 1 | ... | 4C18H34W Block 95 C[124:127], H[0:17], W[0:33] Batch 1 |
| 4C18H34W Block 96 C[0:3], H[16:33], W[0:33] Batch 1 | 4C18H34W Block 97 C[4:7], H[16:33], W[0:33] Batch 1 | ... | 4C18H34W Block 127 C[124:127], H[16:33], W[0:33] Batch 1 |
| ... | ... | ... | ... |
| 4C18H34W Block 4064 C[0:3], H[16:33], W[0:33] Batch 63 | 4C18H34W Block 4065 C[4:7], H[16:33], W[0:33] Batch 63 | ... | 4C18H34W Block 4095 C[124:127], H[16:33], W[0:33] Batch 63 |

FIG. 11

```
int C = 128, K = 128, R = 3, S = 3;

for (int ki = 0; ki < K; ki++)
{
    for (int ci = 0; ci < C; ci++)
    {
        for (int h = 0; h < R; h++)
        {
            for (int w = 0; w < S; w++)
            {
                int blk_y, blk_x,blk_sz,blk_i,blk_y_offset,blk_x_offset;
                int kc_map[8]={0,0,2,2,1,1,3,3};
                blk_y = ki/32;
                blk_x = ci/8;
                blk_sz = 32*8*R*S;
                blk_i = blk_y*C/8+blk_x;
                blk_y_offset = ki%32;
                blk_x_offset = ci%8;

tiling_filter[blk_i*blk_sz + h*S*32*8+
                    w*32*8+kc_map[blk_x_offset]*32*2+blk_y_offset*2
                    +(blk_x_offset&1)] = input_filter[(ki * C + ci)* R * S + h * S + w];
            }
        }
    }
}
```

FIG. 12

```
int H = 32, W = 32, C = 128, K = 128, Hp = 34, Wp = 34, IMAGE_SIZE=34;
for (int b = 0; b < 64; b++)
{
   pos = 0;
   for (int c = 0; c < C; ++c)
   {
      value = b * C + c;
      for (int h = 0; h < IMAGE_SIZE; ++h)
      {
         for (int w = 0; w < IMAGE_SIZE; ++w)
         {
            int blk_y, blk_x,blk_sz,blk_i,blk_y_offset,blk_x_offset;
            blk_y = h < (H/2+2) ? 0 : 1;
            blk_x = c/4;
            blk_sz = Wp*(H/2+2)*4;
            blk_i = blk_y*C/4+blk_x;
            blk_x_offset = c%4;
            blk_y_offset = blk_y?h-H/2: h;

tilling_image [Wp*(Hp+2)*b*C + blk_i*blk_sz +
                blk_y_offset*4*IMAGE_SIZE+4*w+blk_x_offset] = input_image[pos];
            if((h >= H/2)&&(h <= H/2+1))
            {
               blk_y = 1;
               blk_i = blk_y*C/4+blk_x;
               blk_y_offset = blk_y?h-H/2: h;
               tilling_image[Wp*(Hp+2)*b*C + blk_i*blk_sz +
                   blk_y_offset*4*IMAGE_SIZE+4*w+blk_x_offset] = input_image[pos];
            }
            pos++;
         }
      }
   }
}
```

FIG. 13

TILING FORMAT FOR CONVOLUTIONAL NEURAL NETWORKS

PRIORITY INFORMATION

This application is a continuation of U.S. patent application Ser. No. 17/006,533, now U.S. Pat. No. 11,494,592, entitled "TILING FORMAT FOR CONVOLUTIONAL NEURAL NETWORKS", filed Aug. 28, 2020, which is a continuation of U.S. patent application Ser. No. 16/234,956, now U.S. Pat. No. 10,762,392, entitled "TILING FORMAT FOR CONVOLUTIONAL NEURAL NETWORKS", filed Dec. 28, 2018, which claims benefit of priority to Chinese Application No. 201811563959.0, entitled "Tiling Format For Convolutional Neural Networks", filed Dec. 20, 2018, the entirety of which is incorporated herein by reference in its entirety.

BACKGROUND

Description of the Related Art

Performing convolutional filter operations in parallel processing units involves loading large amounts of data from memory which results in high memory bandwidth utilization. Loading filter and input data elements typically requires calculating offsets for stepping through the data elements stored in memory in a linear format. However, this requires a complicated formula for each load instruction to calculate the offset used to move through the elements of the dataset in the correct order to perform the convolutional filter operation. As used herein, the term "linear format" is defined as a format where consecutive dataset elements are stored in a sequential fashion in adjacent memory locations until the end of a physical row or column of memory is reached. Examples of linear formats for storing dataset elements include row-major order and column-major order. In a row-major order format, consecutive elements of a dataset row reside next to each other in memory. In a column-major order format, consecutive elements of a dataset column reside next to each other in memory. Processing dataset elements in a linear format results in an inefficient utilization of memory bandwidth and compute unit processing resources.

BRIEF DESCRIPTION OF THE DRAWINGS

The advantages of the methods and mechanisms described herein may be better understood by referring to the following description in conjunction with the accompanying drawings, in which:

FIG. 4 is a diagram of one implementation of a data layout for a first source matrix being operated on by a SIMD unit.

FIG. 5 is a diagram of one implementation of a data layout for a second source matrix being operated on by a SIMD unit.

FIG. 6 is a diagram of one implementation of a 32K2C1R1S block of convolutional filter data.

FIG. 7 is a diagram of one implementation of a 32K8C block of convolutional filter data.

FIG. 8 is a diagram of one implementation of a convolutional filter data block in a tiling format.

FIG. 9 is a diagram of one implementation of a block of image data.

FIG. 10 is a diagram of one implementation of a 4C18H34 W block of image data.

FIG. 11 is a diagram of one implementation of an image stored in memory.

FIG. 12 illustrates an example of pseudocode for converting convolutional filter data from linear format to tiling format in accordance with one implementation.

FIG. 13 illustrates an example of pseudocode for converting image data from a linear format to a tiling format in accordance with one implementation.

DETAILED DESCRIPTION OF IMPLEMENTATIONS

Figure 1:
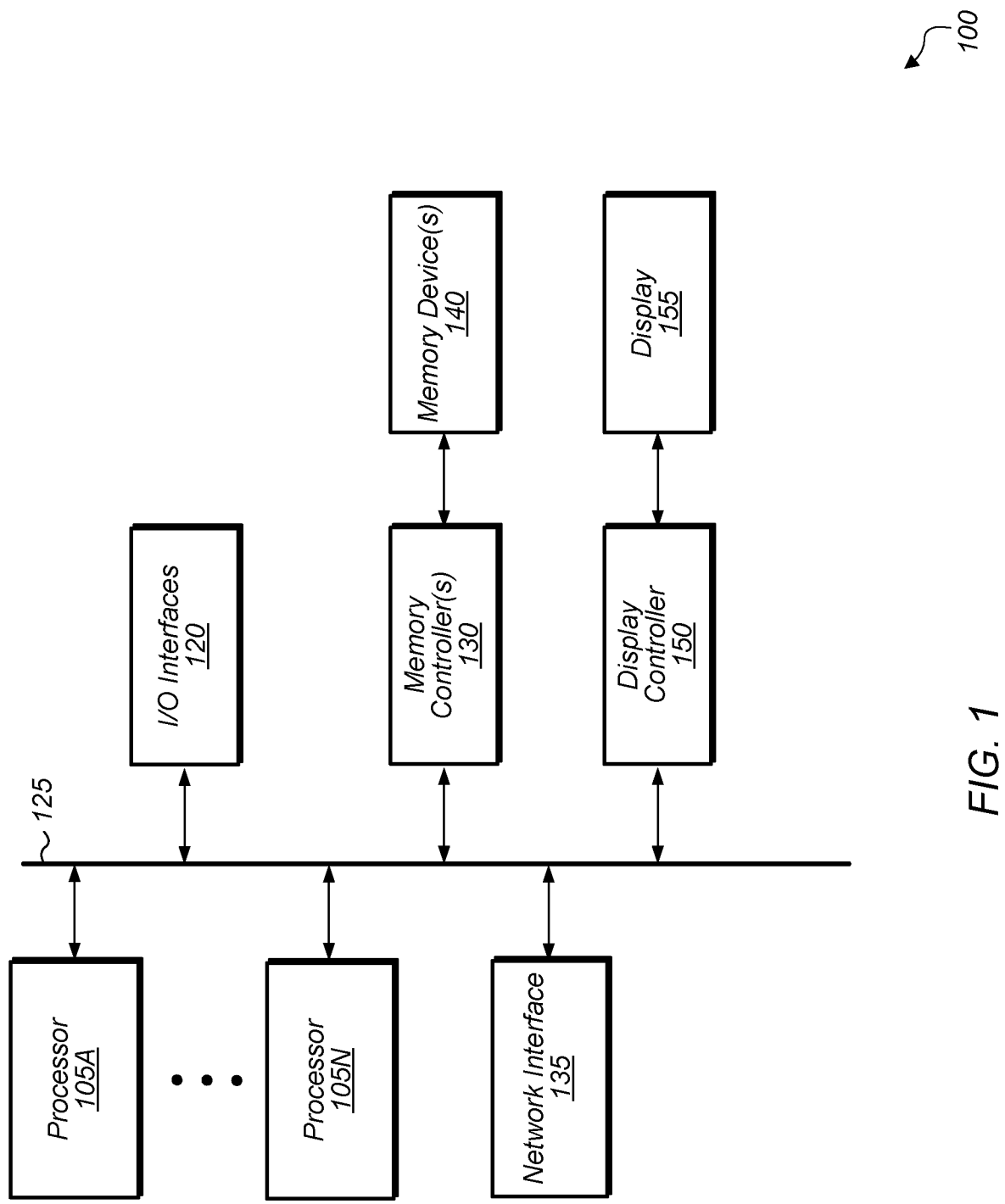
FIG. 1 is a block diagram of one implementation of a computing system.

In the following description, numerous specific details are set forth to provide a thorough understanding of the methods and mechanisms presented herein. However, one having ordinary skill in the art should recognize that the various implementations may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, and methods for converting data to a tiling format for implementing a convolutional neural network are disclosed herein. A system includes at least a memory, a cache, a processor, and a plurality of compute units. The memory stores a first buffer and a second buffer in a linear format, where the first buffer stores convolutional filter data and the second buffer stores image data. The processor converts the convolutional filter data in the first buffer from the linear format to a tiling format and then stores the convolutional filter data in the tiling format to a third buffer. The processor also converts the image data in the second buffer from the linear format to the tiling format and then stores the image data in the tiling format to a fourth buffer.

In one implementation, the term "tile format" or "tiling format" is defined as a format for storing data elements in memory locations such that data elements for performing a convolutional filter operation are stored in adjacent memory locations. In one implementation, the term "convolutional filter operation" is defined as an operation which is performed as part of implementing a convolutional layer of a neural network. In another implementation, the term "tiling format" is defined as a format where data elements that constitute a column of a tile are stored in adjacent memory locations. The tiling format results in the data elements being ordered with a specific layout which allows data elements to be loaded successively without performing an offset calculation. The term "tile" is defined as an N×M block of elements, where N and M are positive integers, and where at least one of N or M is greater than one. A "tile" can also be referred to herein as a "block".

In one implementation, the plurality of compute units load the third buffer and the fourth buffer from the memory to the cache and then implement a convolutional filter operation on the data elements of the third and fourth buffers to generate a result in the tiling format. The system generates a classification of a first dataset based on the result in the tiling format generated by the convolutional filter operation. For example, in one implementation, the system performs a plurality of convolutional filter operations while implementing a neural network so as to classify an image into one or more categories. The neural network can be a convolutional neural network, recurrent neural network, or other type. Various tasks such as hand-written digit classification and face detection can be performed by the neural network. Additionally, neural networks can perform other, more challenging, visual classification tasks. Other applications for neural networks include speech recognition, language modeling, sentiment analysis, text prediction, and others. In other implementations, the system performs a plurality of convolutional filter operations on the plurality of compute units as part of other types of software applications In one implementation, converting the first buffer from the linear format to the third buffer in the tiling format involves a first stage of reading values from sequential locations of a first buffer in the memory, where the first buffer stores data elements in the linear format. Then, converting the first buffer from the linear format to the third buffer in the tiling format involves a second stage of stepping through the third buffer with a stride equal to a sum of a number of input channels and a number of convolutional filters while writing the values to the third buffer, where the third buffer stores data elements in the tiling format.

In one implementation, converting the second buffer from the linear format to the fourth buffer in the tiling format involves a first stage of reading values from sequential locations of the second buffer in the memory, where the second buffer stores elements in the linear format. Then, converting the second buffer from the linear format to the fourth buffer in the tiling format involves a second stage of stepping through the fourth buffer with a stride equal to a number of pixel channels while writing the values to the fourth buffer, where the fourth buffer stores elements in the tiling format.

In one implementation, storing the data elements in the tiling format increases the cache hit efficiency. In a typical application, each compute unit processes different portions of data elements but the portions may map to the same cache channel. This can impact the cache efficiency because different compute units will end up requesting data via the same cache channel. Accordingly, the compute units will be waiting for the data to be returned from the cache, and the cache will be processing the requests one by one in the same channel. However, when the data elements are stored in the tiling format, different compute units are mapped to different channels. When the compute units are executing the same set of instructions in parallel, the requests are sent to the cache on different channels, which helps to increase the cache access efficiency.

Referring now to FIG. 1, a block diagram of one implementation of a computing system 100 is shown. In one implementation, computing system 100 includes at least processors 105A-N, input/output (I/O) interfaces 120, bus 125, memory controller(s) 130, network interface 135, memory device(s) 140, display controller 150, and display 155. In other implementations, computing system 100 includes other components and/or computing system 100 is arranged differently. Processors 105A-N are representative of any number of processors which are included in system 100.

In one implementation, processor 105A is a general purpose processor, such as a central processing unit (CPU). In one implementation, processor 105N is a data parallel processor with a highly parallel architecture. Data parallel processors include graphics processing units (GPUs), digital signal processors (DSPs), field programmable gate arrays (FPGAs), application specific integrated circuits (ASICs), and so forth. In some implementations, processors 105A-N include multiple data parallel processors. In one implementation, processor 105N is a GPU which provides pixels to display controller 150 to be driven to display 155.

Memory controller(s) 130 are representative of any number and type of memory controllers accessible by processors 105A-N. Memory controller(s) 130 are coupled to any number and type of memory devices(s) 140. Memory device (s) 140 are representative of any number and type of memory devices. For example, the type of memory in memory device(s) 140 includes Dynamic Random Access Memory (DRAM), Static Random Access Memory (SRAM), NAND Flash memory, NOR flash memory, Ferroelectric Random Access Memory (FeRAM), or others.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, network interface cards, and so forth. Network interface 135 is used to receive and send network messages across a network.

In various implementations, computing system 100 is a computer, laptop, mobile device, game console, server, streaming device, wearable device, or any of various other types of computing systems or devices. It is noted that the number of components of computing system 100 varies from implementation to implementation. For example, in other implementations, there are more or fewer of each component than the number shown in FIG. 1. It is also noted that in other implementations, computing system 100 includes other components not shown in FIG. 1. Additionally, in other implementations, computing system 100 is structured in other ways than shown in FIG. 1.

Figure 2:
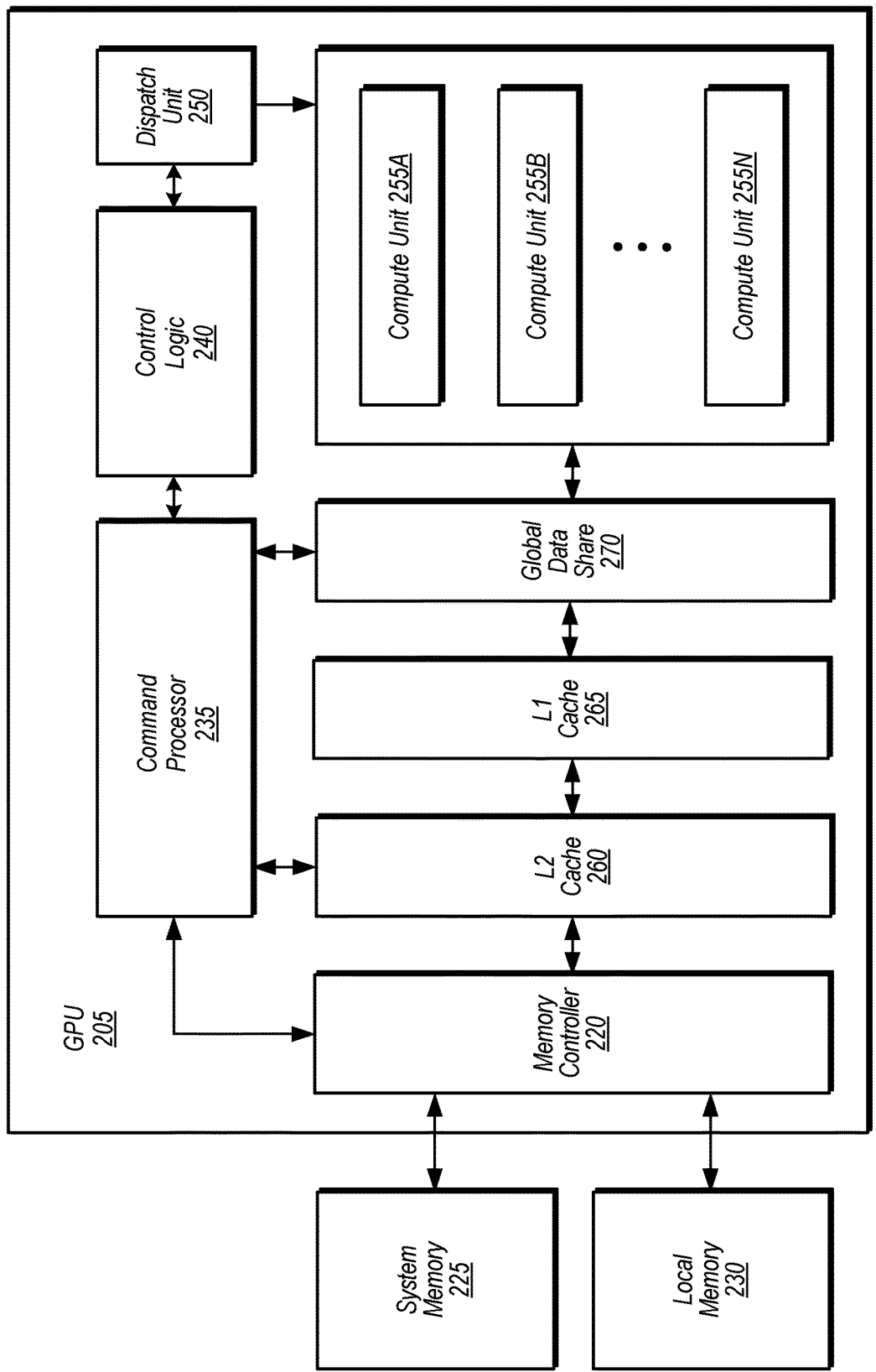
FIG. 2 is a block diagram of another implementation of a computing system.

Turning now to FIG. 2, a block diagram of another implementation of a computing system 200 is shown. In one implementation, system 200 includes GPU 205, system memory 225, and local memory 230. System 200 also includes other components which are not shown to avoid obscuring the figure. GPU 205 includes at least command processor 235, control logic 240, dispatch unit 250, compute units 255A-N, memory controller 220, global data share 270, level one (L1) cache 265, and level two (L2) cache 260. In other implementations, GPU 205 includes other components, omits one or more of the illustrated components, has multiple instances of a component even if only one instance is shown in FIG. 2, and/or is organized in other suitable manners. In one implementation, the circuitry of GPU 205 is included in processor 105N (of FIG. 1).

In various implementations, computing system 200 executes any of various types of software applications. As part of executing a given software application, a host CPU (not shown) of computing system 200 launches kernels to be performed on GPU 205. Command processor 235 receives kernels from the host CPU and uses dispatch unit 250 to issue corresponding wavefronts to compute units 255A-N. In one implementation, each compute unit 255A-N includes a matrix operations unit. For example, in one implementation, the matrix operations unit performs matrix multiplication operations to implement a convolutional layer of a neural network. Additionally, in various implementations, the matrix operations unit performs other types of matrix operations. Wavefronts executing on compute units 255A-N read and write data to global data share 270, L1 cache 265, and L2 cache 260 within GPU 205. Although not shown in FIG. 2, in one implementation, compute units 255A-N also include one or more caches and/or local memories within each compute unit 255A-N.

In one implementation, convolutional filter data and image data are stored in a linear format in system memory 225 and/or local memory 230. Prior to loading the convolutional filter data and image data into L2 cache 260, the convolutional filter data and image data are converted from the linear format to a tiling format. In one implementation, the term "tiling format" is defined as storing elements together into units of tiles, with each tile storing an N×M block of matrix elements, where N and M are positive integers. The "tiling format" results in consecutive tiles being stored in a sequential fashion in memory.

In one implementation, command processor 235 converts the convolutional filter data and image data from the linear format to the tiling format. In another implementation, a host processor (e.g., processor 105A of FIG. 1) converts the convolutional filter data and image data from the linear format to the tiling format. Then, during execution of wavefronts on compute units 255A-N, the convolutional filter data and image data is loaded to and from L2 cache 260 in an efficient manner due to the data being stored in the tiling format. In one implementation, when the convolutional filter data and image data are stored in the tiling format, the data elements are read on multiple channels from L2 cache 260 into compute units 255A-N in parallel. This is a more efficient approach than having the data elements stored in linear format, which would result in data elements being read on a single channel from L2 cache 260 in serial fashion.

Figure 3:
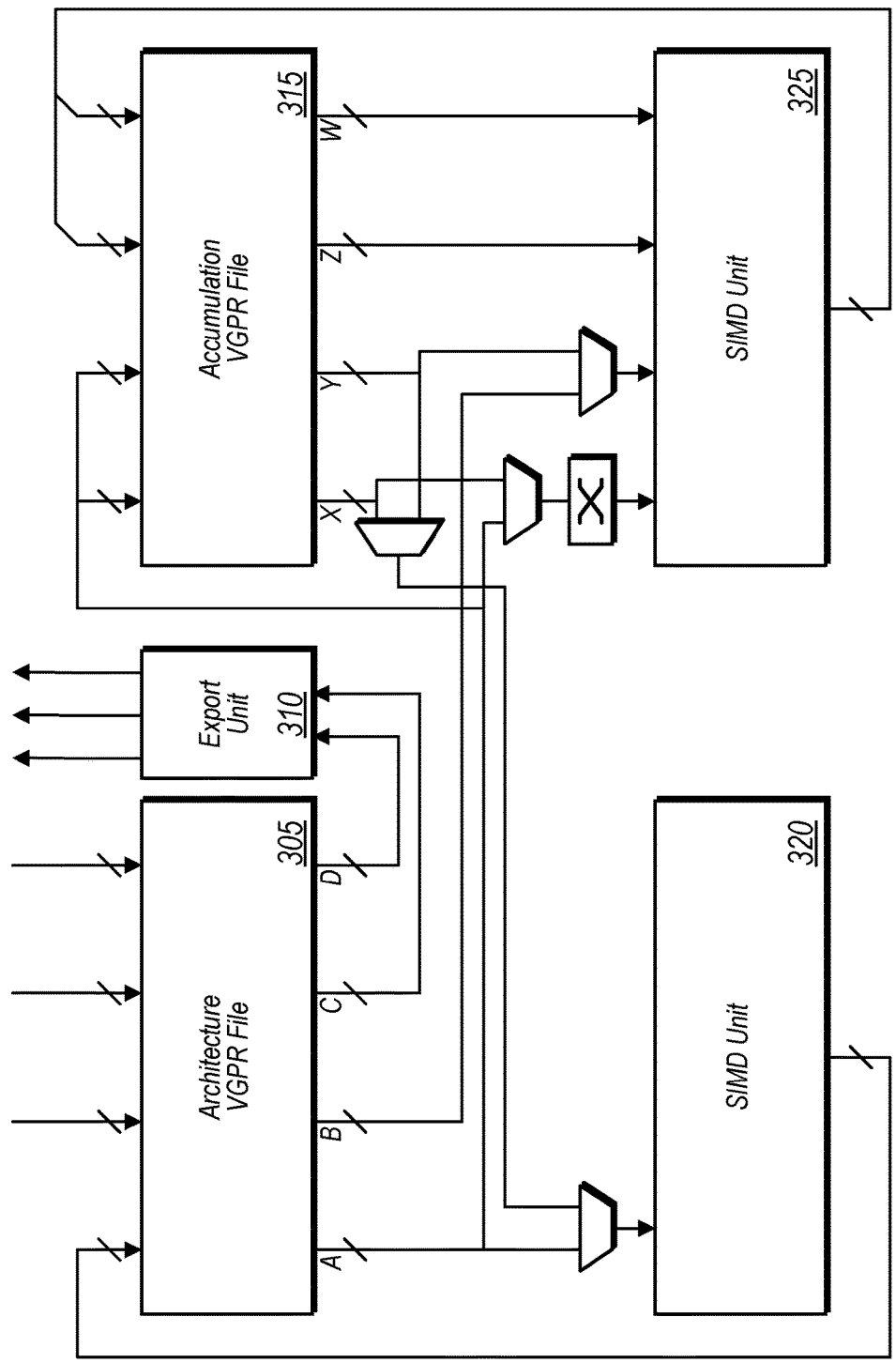
FIG. 3 is a block diagram of one implementation of a matrix operations unit.

Referring now to FIG. 3, a block diagram of one implementation of a matrix operations unit 300 is shown. In one implementation, each compute unit 255A-N includes the circuitry of matrix operations unit 300. In one implementation, matrix operations unit 300 includes at least architecture vector general purpose register (VGPR) file 305, export unit 310, accumulation VGPR file 315, single instruction, multiple data (SIMD) unit 320, and SIMD unit 325. It should be understood that matrix operations unit 300 can also include any number of other components which are not shown to avoid obscuring the figure. Additionally, in other implementations, matrix operations unit 300 is organized in other suitable manners.

In one implementation, SIMD unit 320 is a floating point unit for performing various floating point operations and SIMD unit 325 is a matrix unit for performing various matrix operations (e.g., dot product operations, matrix multiplication operations). In one implementation, each separate input shown connected to architecture VGPR file 305 and accumulation VGPR file 315 has 16 lanes of 32 bits each. In other implementations, the inputs have other numbers of lanes of other bit-widths. In one implementation, SIMD unit 325 operates on data elements more efficiently when the data elements are stored in a tiling format. Accordingly, in this implementation, the data elements are converted from a linear format to the tiling format prior to being read into architecture VGPR file 305 and/or accumulation VGPR file 315. This enables the operations to be performed by SIMD unit 325 in a more efficient manner.

Figure 4:
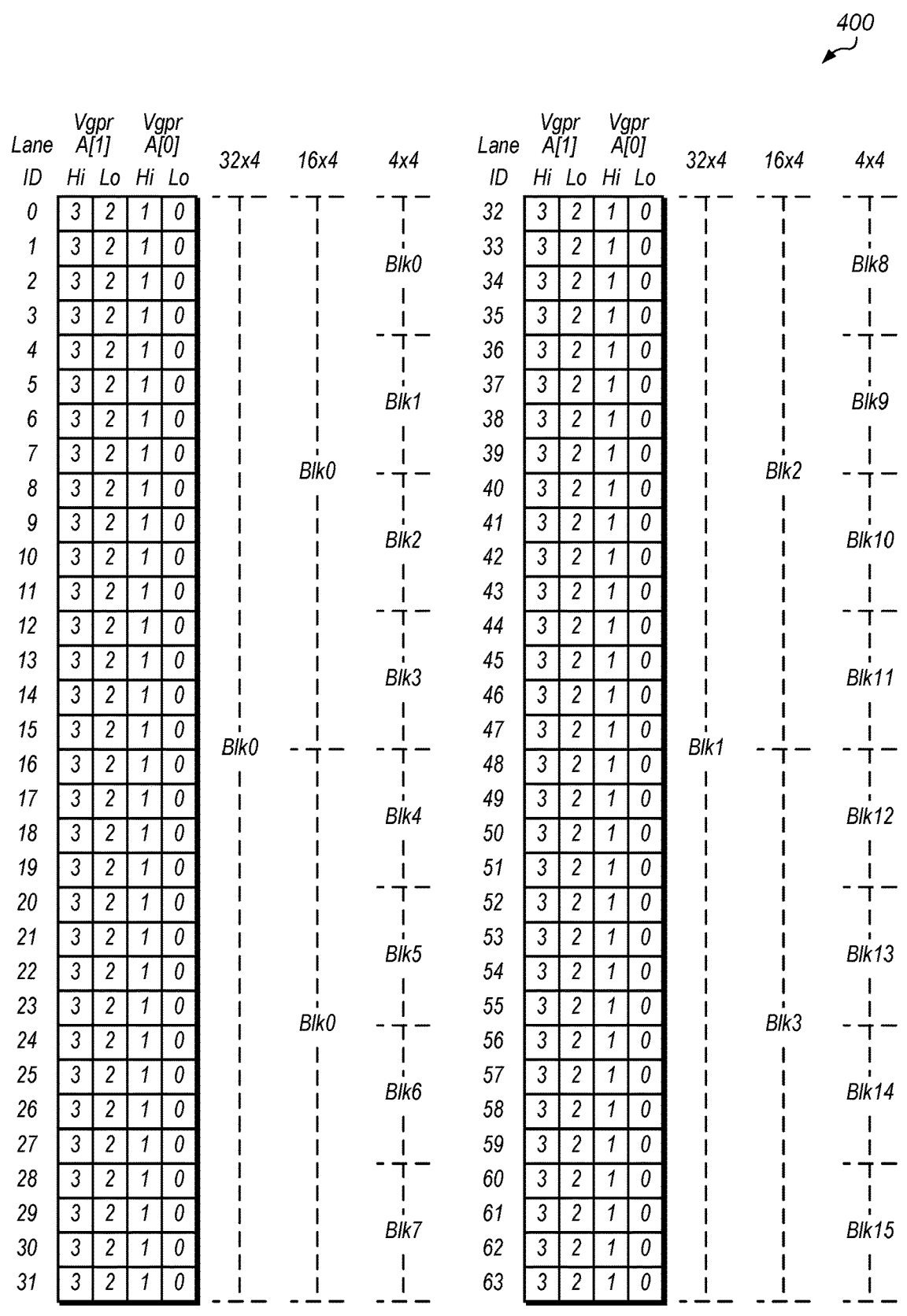

Turning now to FIG. 4, a diagram of one implementation of the data layout 400 of a first source matrix being operated on by a SIMD unit is shown. In one implementation, SIMD unit 325 (of FIG. 3) is organized according to the data layout 400 illustrated in FIG. 4 for reading in a first source matrix to perform a matrix multiplication operation of a first source matrix multiplied by a second source matrix. It is noted that a "source matrix" can also be referred to herein as a "dataset". For example, in this implementation, there are 64 threads in data layout 400 per SIMD unit. Each thread of data layout 400 corresponds to a lane of the SIMD unit. In other implementations, the SIMD unit includes other numbers (e.g., 32, 128) of lanes.

Depending on the size of a block being processed, different numbers of blocks can be mapped according to data layout 400. For example, if each block is of size 32×4, then two blocks (Blk0 and Blk1) are mapped from the VGPR file to the SIMD unit. If each block is of size 16×4, then four blocks (Blk0, Blk1, Blk2, and Blk3) are mapped from the VGPR file to the SIMD unit. If each block is of size 4×4, then sixteen blocks (Blk0, Blk1, Blk2, Blk3, Blk4, Blk5, Blk6, Blk7, Blk8, Blk9, Blk10, Blk11, Blk12, Blk13, Blk14, and Blk15) are mapped from the VGPR file to the SIMD unit.

Figure 5:
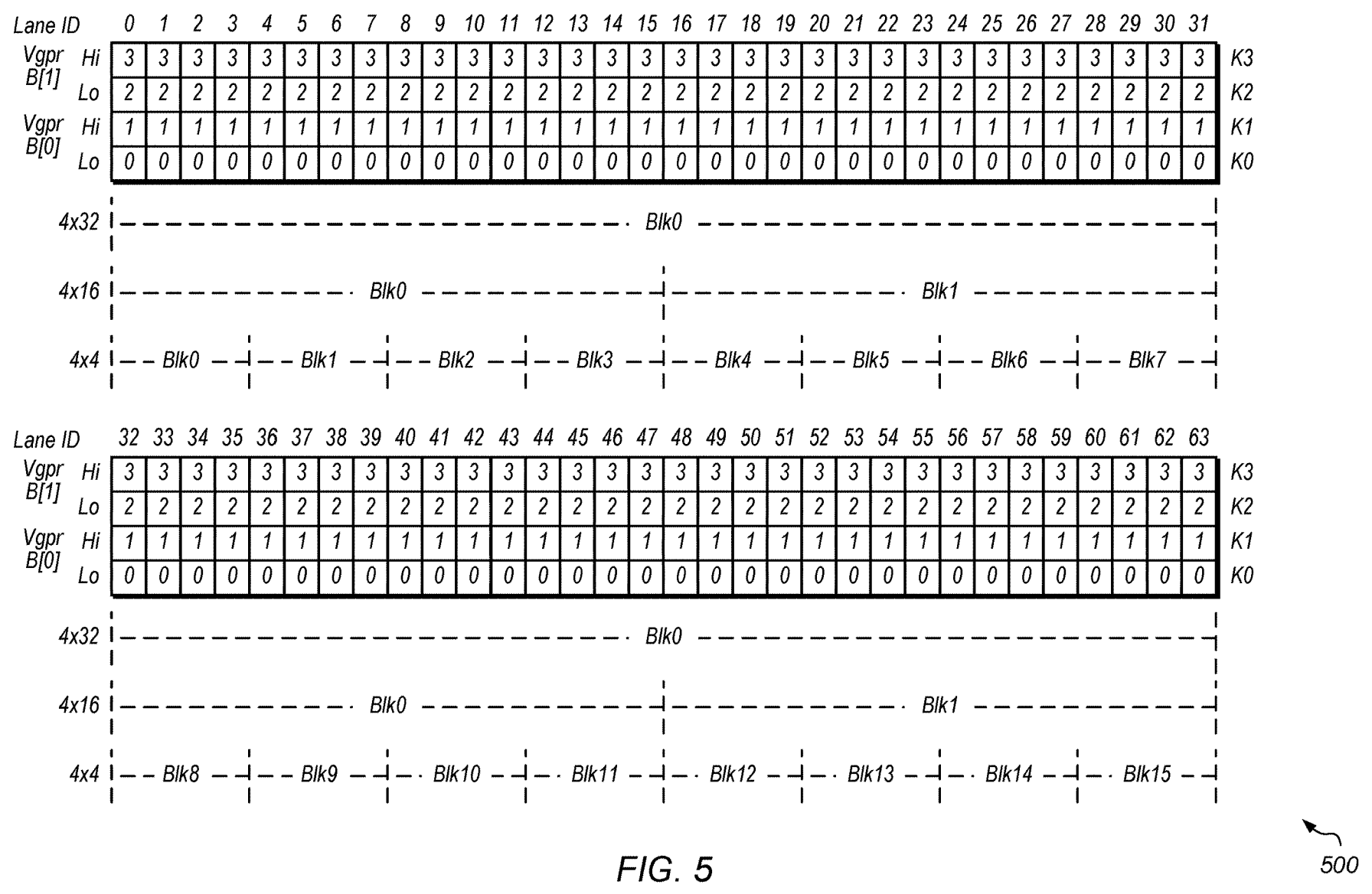

Referring now to FIG. 5, a diagram of one implementation of a data layout 500 for a second source matrix being operated on by a SIMD unit is shown. In one implementation, the connections between a VGPR file and a SIMD unit (e.g., SIMD unit 325 (of FIG. 3)) are organized according to the data layout 500. For example, in one implementation, data layout 500 defines the connections for loading a second source matrix so as to perform a matrix multiplication operation between a first source matrix and a second source matrix. In one implementation, data layout 500 is organized for 64 threads. In other implementations, data layout 500 can be organized for other numbers of threads. Each thread of data layout 500 corresponds to a lane of the SIMD unit. Depending on the size (e.g., 4×32, 4×16, 4×4) of a block being processed, different numbers (e.g., 2, 4, 16) of blocks can be mapped according to data layout 500.

Turning now to FIG. 6, a diagram of one implementation of a 32K2C1R1S block 600 of convolutional filter data is shown. In one implementation, a convolutional filter dataset is constructed from a plurality of 32K2C1R1S blocks, with each 32K2C1R1S block 600 containing 1 shared weight from 32 filters and 2 input channels. In one implementation, the shared weight is one of the weights of a 3×3 convolutional filter. As shown in FIG. 6, the convolutional filter data is denoted as K[x]C[y]R[z]S[w] which specifies that the data is in filter offset x, channel offset y, row offset z, and column offset w. As used here, for a 32K2C1R1S block 600, the number before the letter refers to the dimension of the variable referred to by the letter. Accordingly, 32K2C1R1S block 600 includes a single shared weight for 32 separate convolutional filters for 2 separate input channels. It is noted that the term "kernel" and "filter" can be used interchangeably herein.

Referring now to FIG. 7, a diagram of one implementation of a 32K8C block 700 of convolutional filter data is shown. In one implementation, the 32K2C1R1S blocks shown within 32K8C block 700 are organized according to 32K2C1R1S block 600 of FIG. 6. In other implementations, 32K8C block 700 can be constructed with other sizes and/or arrangements of constituent blocks. In one implementation, all of the weights for a 3×3 convolutional filter for 8 input channels are combined together to create 32K8C block 700. For example, the first row of 32K8C block 700 includes a 32K2C1R1S block for channels [0:1] followed by a 32K2C1R1S block for channels [4:5] followed by a 32K2C1R1S block for channels [2:3] and finally a 32K2C1R1S for channels [6:7], with these 32K2C1R1S blocks including a weight for a first row R=0 and a first column S=0 of a corresponding 3×3 convolutional filter. The second row of 32K8C block 700 includes a 32K2C1R1S block for channels [0:1] followed by a 32K2C1R1S block for channels [4:5] followed by a 32K2C1R1S block for channels [2:3] and finally a 32K2C1R1S for channels [6:7], with these 32K2C1R1S blocks including a weight for a first row R=0 and a second column S=1 of the corresponding 3×3 convolutional filter. The remaining rows of 32K8C block 700 continue with this same pattern.

Turning now to FIG. 8, a diagram of one implementation of a convolutional filter data block 800 in a tiling format is shown. In one implementation, filter data block 800 is composed of 64 32K8C blocks each of which is organized according to 32K8C block 700 (of FIG. 7). In one implementation, filter data block 800 includes 128 filters and 128 channels. In other implementations, filter data block 800 can include other numbers of filters and channels.

In one implementation, the leftmost block of the first row of convolutional filter data block 800 includes a 32K8C block for filters [0:31] and channels [0:7]. Moving to the right, the next block of the first row includes a 32K8C block for filters [0:31] and channels [8:15]. This pattern continues, until the right-most block of the first row includes a 32K8C block for filters [0:31] and channels [120:127]. The second row of filter block 800 starts with a 32K8C block for filters [32:63] and channels [0:7] followed by a 32K8C block for filters [32:63] and channels [8:15] and continuing with subsequent channels until the right-most 32K8C block of the second row corresponds to filters [32:63] and channels [120:127]. This pattern continues for the remaining rows of filter block 800 as shown in FIG. 8. It should be understood that the dimensions of the convolutional filter data block 800 are indicative of one particular implementation. In other implementations, other sizes and/or arrangements of blocks can be combined together to form convolutional filter data block 800.

Figure 9:
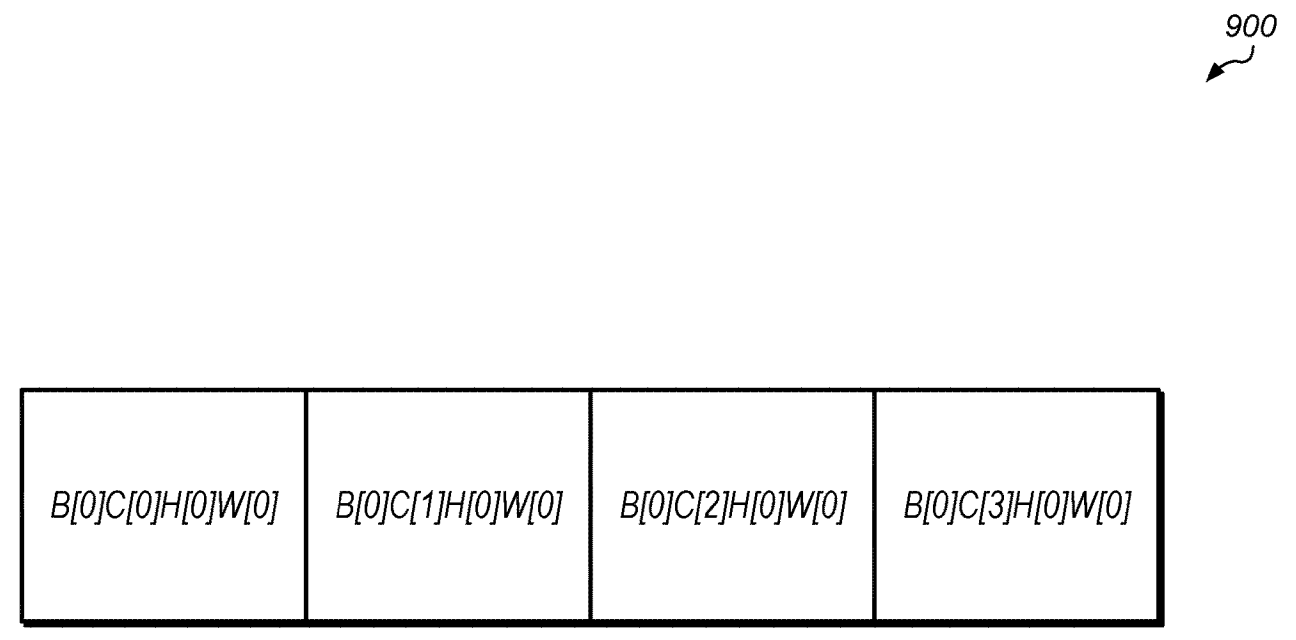

Referring now to FIG. 9, a diagram of one implementation of a block 900 of image data is shown. In one implementation, block 900 is referred to as a 4C1H1 W block. The number-letter pair 4C refers to block 900 having 4 channels, the number-letter pair 1H refers to block 900 having a height of 1 pixel, and the number-letter pair 1 W refers to block 900 having a width of 1 pixel. Additionally, the labels within each box of block 900 are denoted in the format of B[x]C[y]H[z]W[w]. As used herein, the label B[x]C[y]H[z]W[w] indicates that the data is in batch offset x, channel offset y, image row offset z, and image column offset w. Accordingly, the different labels have the following definitions: B is the image batch number, C is the pixel channel, H is the image height, and W is the image width.

As shown in FIG. 9, 4C1H1W block 900 includes a B[0]C[0]H[0]W[0] pixel followed by a B[0]C[1]H[0]W[0] pixel followed by a B[0]C[2]H[0]W[0] pixel and followed by a B[0]C[3]H[0]W[0] pixel. Accordingly, 4C1H1 W block 900 contains a single pixel from each of 4 separate pixel channels. It should be understood that the illustration of block 900 shown in FIG. 9 is merely one example of a block which is constructed in one particular implementation. In other implementations, a block of other dimensions and/or other constituent blocks can be constructed.

Turning now to FIG. 10, a diagram of one implementation of a 4C18H34 W block 1000 is shown. As used herein, the term "4C18H34 W block" refers to a block with 4 channels, 18 rows of pixels, and 34 columns of pixels. In other implementations, a block 1000 of other dimensions besides a height of 18 and a width of 34 can be constructed. In one implementation, each 4C18H34 W block 1000 includes 17 rows of 34 columns of 4C1H1 W blocks. In one implementation, the 4C1H1 W blocks which are part of 4C18H34 W block 1000 are organized according to 4C1H1 W block 900 (of FIG. 9). As shown in FIG. 10, the first row of 4C18H34 W block 1000 is constructed with 33 4C1H1 W blocks from pixel location H=0, W=0 to pixel location H=0, W=33. The second row of 4C18H34 W block 1000 is constructed with 33 4C1H1 W blocks from pixel location H=1, W=0 to pixel location H=1, W=33. This pattern continues until the bottom row of 4C18H34 W block 1000 has 33 4C1H1 W blocks from pixel location H=17, W=0 to pixel location H=17, W=33

Referring now to FIG. 11, a diagram of one implementation of an image 1100 stored in memory is shown. Image 1100 represents a tiling format for storing image data in memory in accordance with one implementation. Image 1100 is a 64 batch, 128 channel, 34×34 image constructed of 4C18H34 W blocks. In one implementation, the 4C18H34 W blocks of image 1100 are constructed according to 4C18H34 W block 1000 (of FIG. 10).

The first block of the first row of image 1100 is a 4C18H34 W block of channels [0:3] of rows [0:17] of columns [0:33] of batch 0 of image data. The second block of the first row is a 4C18H34 W block of channels [4:7] of rows [0:17] of columns [0:33] of batch 0 of image data. This pattern continues until the last block of the first row is a 4C18H34 W block of channels [124:127] of rows [0:17] of columns [0:33] of batch 0 of image data. The second row of image 1100 starts with a 4C18H34 W block of channels [0:3] of rows [16:33] of columns [0:33] of batch 0 of image data. The next block, moving to the right, of the second row of image 1100 is a 4C18H34 W block of channels [4:7] of rows [16:33] of columns [0:33] of batch 0 of image data. This pattern continues until the last block of the second row is a 4C18H34 W block of channels [124:127] of rows [16:33] of columns [0:33] of batch 0 of image data. The third row of image 1100 starts with a 4C18H34 W block of channels [0:3] of rows [0:17] of columns [0:33] of batch 1 of image data. The next block, moving to the right, of the third row of image 1100 is a 4C18H34 W block of channels [4:7] of rows [0:17] of columns [0:33] of batch 1 of image data. This pattern continues until the last block of the third row is a 4C18H34 W block of channels [124:127] of rows [0:17] of columns [0:33] of batch 1 of image data.

This pattern of rows continues until the bottom row of image 1100. The bottom row of image 1100 has a 4C18H34 W block of channels [0:3] of rows [16:33] of columns [0:33] of batch 63 of image data. The second block of the bottom row is a 4C18H34 W block of channels [4:7] of rows [16:33] of columns [0:33] of batch 63 of image data. This pattern continues until the last block of the bottom row is a 4C18H34 W block of channels [124:127] of rows [16:33] of columns [0:33] of batch 63 of image data.

Turning now to FIG. 12, an example of pseudocode 1200 for converting convolutional filter data from linear format to tiling format in accordance with one implementation is shown. Pseudocode 1200 includes definitions of variables C, K, R, and S with specific values that are used for one particular implementation. For example, C is equal to 128 for 128 channels, K is equal to 128 for 128 filters (i.e., kernels), R is equal to 3 for 3 rows per filter, and S is equal to 3 for 3 columns per filter. In other implementations, the values of these variables can vary depending on the numbers of channels, numbers of filters, and sizes of filters. Also, the other variables used in pseudocode 1200 can also vary depending on the size of tiles, number of lanes and bit-widths of compute units and/or matrix multiplication units, number of cache channels, definitions of the different fields of corresponding software instructions, and so on.

In one implementation, there are two buffers in memory for the convolutional filter data. The buffer input_filter[ ] stores the convolutional filter data in memory in the linear format. The buffer tiling_filter[ ] stores the convolutional filter data in memory in the tiling format after the conversion has been performed. After the convolutional filter data in input_filter[ ] is converted from the linear format to the tiling format and stored in tiling_filter[ ], the code executing on the compute units will load the convolutional filter data from tiling_filter[ ] into the cache (e.g., L2 cache).

Referring now to FIG. 13, one example of pseudocode 1300 for converting image data from a linear format to a tiling format is shown. In one implementation, pseudocode 1300 is used to convert image data from a linear format to a tiling format. Once the image data is converted from the linear format to the tiling format, the compute units will load the image data in the tiling format from memory into the cache.

Pseudocode 1300 includes definitions of variables H, W, C, K, Hp, Wp, and IMAGE_SIZE with specific values that are used for one particular implementation. For example, in one implementation, H is equal to 32 for 32 rows per tile, W is equal to 32 for 32 columns per tile, C is equal to 128 for 128 channels, K is equal to 128 for 128 filters (i.e., kernels), Hp is equal to 34 for 34 rows per image, Wp is equal to 34 for 34 columns per image, and IMAGE_SIZE is equal to 34. In other implementations, the values of these variables can vary depending on the numbers of channels, size of the image, size of a tile, and so on. Also, the other variables used in pseudocode 1300 can also vary depending on the size of tiles, number of lanes and bit-widths of compute units and/or matrix multiplication units, number of cache channels, definitions of the different fields of corresponding software instructions, and so on.

In one implementation, there are two buffers in memory for the image data. The buffer input_image[ ] stores the image data in memory in the linear format. After the conversion has been performed, the buffer tiling_image[ ] stores the convolutional filter data in memory in the tiling format. After the convolutional filter data in input_image[ ] is converted from the linear format to the tiling format and stored in tiling_image[ ], the code executing on the compute units will load the image data in the tiling format from tiling_image[ ] into the cache (e.g., L2 cache). Then, matrix multiplication operations are performed to multiply elements of the buffer tiling_filter[ ] of pseudocode 1200 (of FIG. 12) by corresponding elements of the buffer tiling_image[ ].

Figure 14:
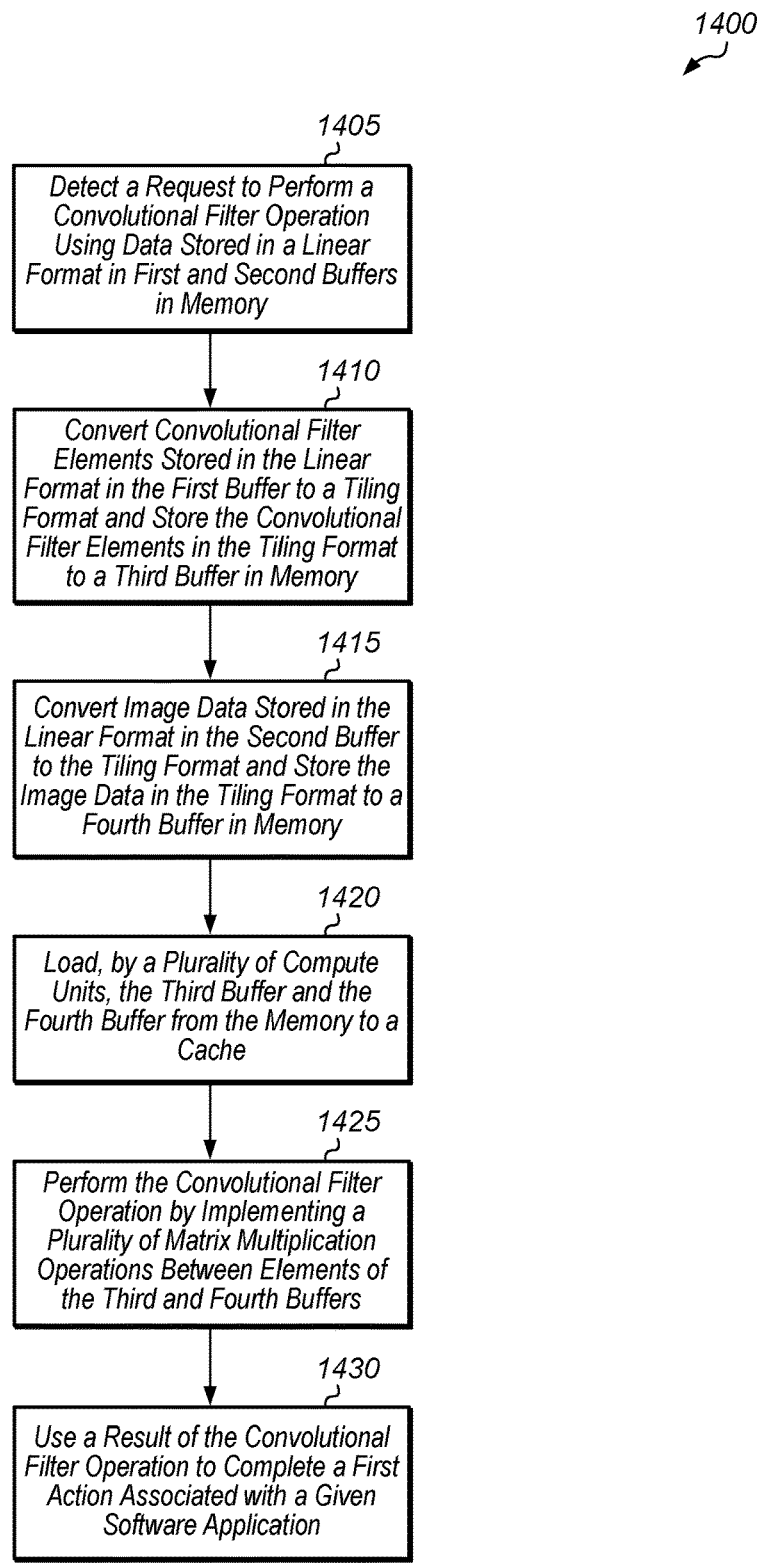
FIG. 14 is a generalized flow diagram illustrating one implementation of a method for implementing a convolutional layer of a machine learning engine using a tiling format.
Figure 15:
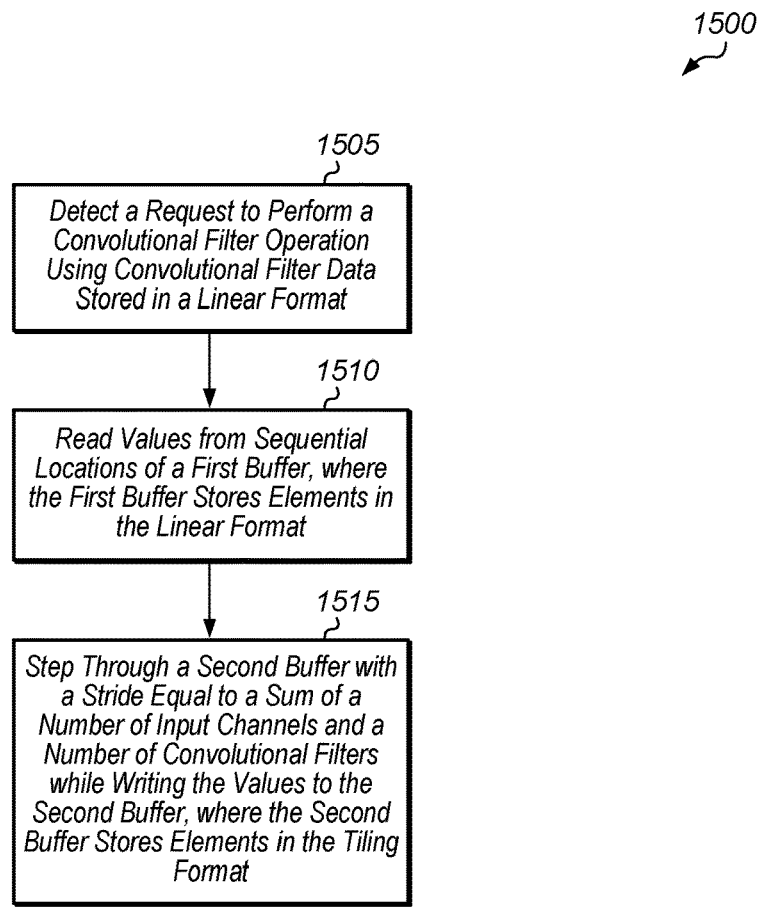
FIG. 15 is a generalized flow diagram illustrating one implementation of a method for transferring a first buffer of convolutional filter data from a linear format to a second buffer in the tiling format.
Figure 16:
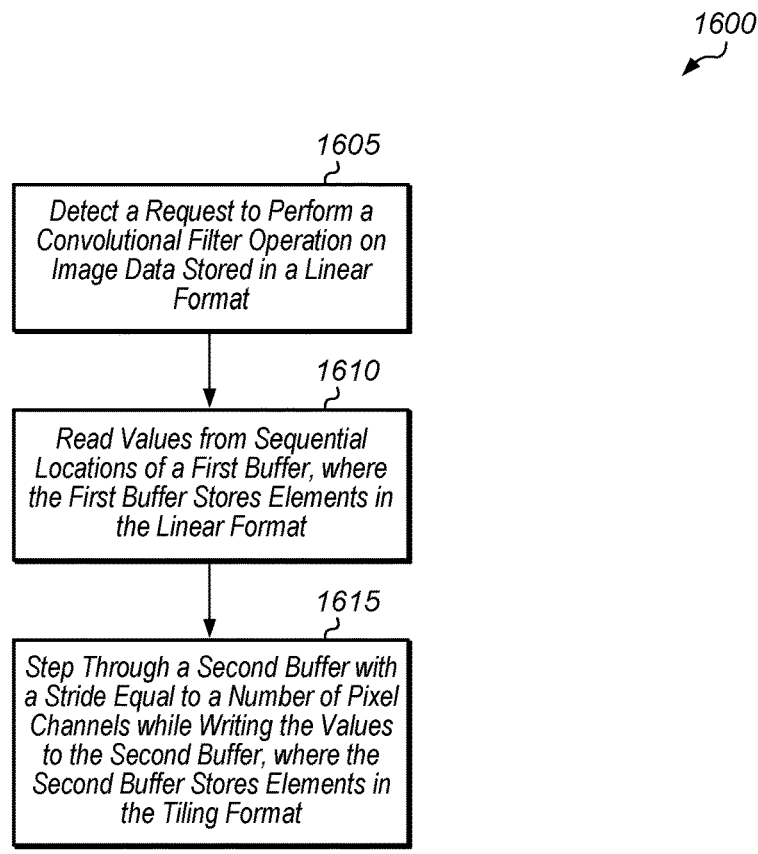
FIG. 16 is a generalized flow diagram illustrating one implementation of a method for transferring a first buffer of image data from a linear format to a second buffer in the tiling format.

Turning now to FIG. 14, one implementation of a method 1400 for implementing a convolutional layer of a machine learning engine using a tiling format is shown. For purposes of discussion, the steps in this implementation those of FIG. 15-16 are shown in sequential order. However, it is noted that in various implementations of the described methods, one or more of the elements described are performed concurrently, in a different order than shown, or are omitted entirely. Other additional elements are also performed as desired. Any of the various systems or apparatuses described herein are configured to implement method 1400.

A processor (e.g., host CPU) detects a request to perform a convolutional filter operation using data stored in a linear format in first and second buffers in memory (block 1405). In response to detecting the request, the processor converts convolutional filter elements stored in the linear format in the first buffer to a tiling format and stores the convolutional filter elements in the tiling format to a third buffer in memory (block 1410). One example of converting convolutional filter elements from the linear format to the tiling format is described in pseudocode 1200 (of FIG. 12).

Also, in response to detecting the request, the processor converts image data stored in the linear format in the second buffer to the tiling format and stores the image data in the tiling format to a fourth buffer in memory (block 1415). One example of converting the image data from the linear format to the tiling format is described in pseudocode 1300 (of FIG. 13). Then, a plurality of compute units load the third buffer and the fourth buffer from the memory to a cache (block 1420). In one implementation, the plurality of compute units are part of a GPU and the cache is a L2 cache. Next, the plurality of compute units perform the convolutional filter operation by implementing a plurality of matrix multiplication operations between elements of the third and fourth buffers (block 1425). Then, the computing system uses a result of the convolutional filter operation to complete a first action associated with a given software application (block 1430). In one implementation, the first action is the classification of a first dataset and the given software application is a machine learning application. In one implementation, the first dataset is an image, and the classification identifies a given category to which the image belongs. In another implementation, the first dataset is a video, and the classification assigns the video to a given category. In other implementations, the first dataset includes other types of data. In other implementations, other types of actions associated with other types of software applications are performed. After block 1430, method 1400 ends.

Referring now to FIG. 15, one implementation of a method for transferring a first buffer of convolutional filter data from a linear format to a second buffer in the tiling format is shown. A processor detects a request to perform a convolutional filter operation using convolutional filter data stored in a linear format (block 1505). In response to detecting the request, the processor reads values from sequential locations of a first buffer, where the first buffer stores elements in the linear format (block 1510). Then, the processor steps through a second buffer with a stride equal to a sum of a number of input channels and a number of convolutional filters while writing the values to the second buffer, where the second buffer stores elements in the tiling format (block 1515). In other words, the processor writes the values (which were read from the first buffer) to locations in the second buffer that are separated by a given stride, where the given stride is equal to a sum of a number of input channels and a number of convolutional filters. After block 1515, method 1500 ends.

Turning now to FIG. 16, one implementation of a method for transferring a first buffer of image data from a linear format to a second buffer in the tiling format is shown. A processor detects a request to perform a convolutional filter operation on image data stored in a linear format (block 1605). In response to detecting the request, the processor reads values from sequential locations of a first buffer, where the first buffer stores elements in the linear format (block 1610). Then, the processor steps through a second buffer with a stride equal to a number of pixel channels while writing the values to the second buffer, where the second buffer stores elements in the tiling format (block 1615). In other words, the processor writes the values (which were read from the first buffer) to locations in the second buffer that are separated by a given stride, where the given stride is equal to a number of pixel channels. After block 1615, method 1600 ends.

In various implementations, program instructions of a software application are used to implement the methods and/or mechanisms described herein. For example, program instructions executable by a general or special purpose processor are contemplated. In various implementations, such program instructions are represented by a high level programming language. In other implementations, the program instructions are compiled from a high level programming language to a binary, intermediate, or other form. Alternatively, program instructions are written that describe the behavior or design of hardware. Such program instructions are represented by a high-level programming language, such as C. Alternatively, a hardware design language (HDL) such as Verilog is used. In various implementations, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described implementations are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
a processor comprising circuitry, wherein in response to a request to perform a convolutional filter operation, the processor is configured to:
read convolutional data stored in a linear format from sequential locations in a memory device; and
convert the convolutional data from the linear format to a tiling format by writing the read convolutional data to memory locations according to a stride greater than one.

2. The apparatus as recited in claim 1, wherein the stride is based on a number of input channels and a number of convolutional filters.

3. The apparatus as recited in claim 1, wherein the stride is equal to a sum of a number of input channels and a number of convolutional filters.

4. The apparatus as recited in claim 1, wherein the stride is equal to a number of pixel channels.

5. The apparatus as recited in claim 1, wherein the convolutional data comprises a plurality of convolutional filters.

6. The apparatus as recited in claim 5, wherein each convolutional filter of the plurality of convolutional filters has three rows and three columns.

7. The apparatus as recited in claim 1, further comprising a second processor configured to generate a classification of a first dataset based on the data in the tiling format.

8. A method comprising:
receiving a request to perform a convolutional filter operation; and
in response to the request:
reading convolutional data stored in a linear format from sequential locations in a memory device; and
converting the convolutional data from the linear format to a tiling format by writing the read convolutional data to memory locations according to a stride greater than one.

9. The method as recited in claim 8, wherein the stride is based on a number of input channels and a number of convolutional filters.

10. The method as recited in claim 8, wherein the stride is equal to a sum of a number of input channels and a number of convolutional filters.

11. The method as recited in claim 8, wherein the stride is equal to a number of pixel channels.

12. The method as recited in claim 8, wherein the convolutional data comprises a plurality of convolutional filters.

13. The method as recited in claim 12, wherein each convolutional filter of the plurality of convolutional filters has three rows and three columns.

14. The method as recited in claim 8, further comprising a second processor configured to generate a classification of a first dataset based on the data in the tiling format.

15. A non-transitory storage medium comprising program instructions, wherein the program instructions are executable to:
receive a request to perform a convolutional filter operation; and
in response to the request:
read convolutional data stored in a linear format from sequential locations in a memory device; and
convert the convolutional data from the linear format to a tiling format by writing the read convolutional data to memory locations according to a stride greater than one.

16. The non-transitory storage medium as recited in claim 15, wherein the stride is based on a number of input channels and a number of convolutional filters.

17. The non-transitory storage medium as recited in claim 15, wherein the stride is equal to a sum of a number of input channels and a number of convolutional filters.

18. The non-transitory storage medium as recited in claim 15, wherein the stride is equal to a number of pixel channels.

19. The non-transitory storage medium as recited in claim 15, wherein the convolutional data comprises a plurality of convolutional filters.

20. The non-transitory storage medium as recited in claim 19, wherein each convolutional filter of the plurality of convolutional filters has three rows and three columns.

* * * * *

UNITED STATES PATENT AND TRADEMARK OFFICE
CERTIFICATE OF CORRECTION

| | | |
|---|---|---|
| PATENT NO. | : 11,900,253 B2 | Page 1 of 1 |
| APPLICATION NO. | : 18/050939 | |
| DATED | : February 13, 2024 | |
| INVENTOR(S) | : Zhang et al. | |

It is certified that error appears in the above-identified patent and that said Letters Patent is hereby corrected as shown below:

On the Title Page

Item (73) Line 1, please delete "Advanced Mic ro Devices, Inc." and insert -- Advanced Micro Devices, Inc. --.

Signed and Sealed this
Ninth Day of April, 2024

Katherine Kelly Vidal
*Director of the United States Patent and Trademark Office*